United States Patent
Troia et al.

(10) Patent No.: US 12,052,345 B2
(45) Date of Patent: *Jul. 30, 2024

(54) SECURE SENSOR COMMUNICATION

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,692

(22) Filed: May 15, 2022

(65) Prior Publication Data

US 2022/0271926 A1 Aug. 25, 2022

Related U.S. Application Data

(63) Continuation of application No. 16/362,854, filed on Mar. 25, 2019, now Pat. No. 11,336,433.

(51) Int. Cl.
*H04L 9/08* (2006.01)
*H04L 9/32* (2006.01)
*H04L 9/40* (2022.01)
*H04L 67/12* (2022.01)

(52) U.S. Cl.
CPC .......... *H04L 9/0825* (2013.01); *H04L 9/3263* (2013.01); *H04L 63/0876* (2013.01); *H04L 67/12* (2013.01)

(58) Field of Classification Search
CPC ... H04L 9/0825; H04L 9/3263; H04L 9/3297; H04L 9/3247; H04L 9/3239; H04L 9/3242; H04L 9/3252; H04L 63/0876; H04L 63/0442; H04L 63/0823; H04L 67/12; H04L 2209/38; H04L 2209/805; H04L 2209/84; H04W 4/38; H04W 4/48; G06F 21/602; G06F 21/76
See application file for complete search history.

(56) References Cited

U.S. PATENT DOCUMENTS

2008/0215890 A1* 9/2008 Buer ............... H04L 9/085
 713/186
2013/0086378 A1* 4/2013 Yao ............... H04L 63/0281
 713/156

(Continued)

OTHER PUBLICATIONS

U.S. Appl. No. 15/853,498, entitled, "Physical Unclonable Function Using Message Authentication Code", filed Dec. 22, 2017, 28 pages.

(Continued)

*Primary Examiner* — Khoi V Le
(74) *Attorney, Agent, or Firm* — Brooks, Cameron & Huebsch, PLLC

(57) ABSTRACT

The present disclosure includes apparatuses, methods, and systems for securing sensor communication. An embodiment includes a memory having instructions executable by the processing resource, and a sensor coupled to the processing resource and the memory. Wherein, the sensor is configured to collect sensor data and generate and provide a sensor public key, a sensor public identification, and a sensor identification certificate to a sensor fusion unit.

17 Claims, 8 Drawing Sheets

(56) References Cited

U.S. PATENT DOCUMENTS

| | | | | |
|---|---|---|---|---|
| 2014/0294178 | A1* | 10/2014 | Toledo | H04L 9/3236 |
| | | | | 380/255 |
| 2016/0294829 | A1* | 10/2016 | Angus | H04L 63/18 |
| 2017/0244565 | A1* | 8/2017 | Bronk | H04W 12/106 |
| 2017/0346851 | A1* | 11/2017 | Drake | H04L 9/0838 |
| 2018/0091596 | A1* | 3/2018 | Alvarez | H04L 63/0428 |
| 2020/0295929 | A1* | 9/2020 | Kim | H04L 9/0897 |

OTHER PUBLICATIONS

U.S. Appl. No. 16/201,652, entitled, "Parking Infrastructure Powered by a Decentralized, Distributed Database", filed Nov. 27, 2018, 27 pages.

U.S. Appl. No. 15/993,119, entitled, "Transmission of Vehicle Route Information by Passive Devices", filed May 30, 2018, 25 pages.

U.S. Appl. No. 16/034,763, entitled, "Secure Vehicular Communication", filed Jul. 13, 2018, 37 pages.

U.S. Appl. No. 16/034,809, entitled, "Secure Vehicular Services Communication", filed Jul. 13, 2018, 36 pages.

PCT International Application No. PCT/IB2019/000089, entitled, "Method for Improving Safety of a Component or System Running a Firmware or a Finite State Machine", filed Feb. 22, 2019, 42 pages.

\* cited by examiner

SECURE SENSOR COMMUNICATION

PRIORITY INFORMATION

This application is a Continuation of U.S. application Ser. No. 16/362,854 filed on Mar. 25, 2019, which will issue as U.S. Pat. No. 11,336,433 on May 17, 2022, the contents of which are incorporated herein by reference.

TECHNICAL FIELD

The present disclosure relates generally to semiconductor memory and methods, and more particularly, to secure sensor communication.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Memory devices can be utilized in vehicles (e.g., automobiles, cars, trucks, buses, etc.). A vehicle can generate a large amount of data from a number of sensors to operate the vehicle. In some examples, unreliable data used to operate the vehicle could result in injury or death to passengers in the vehicle.

DETAILED DESCRIPTION

Figure 1:
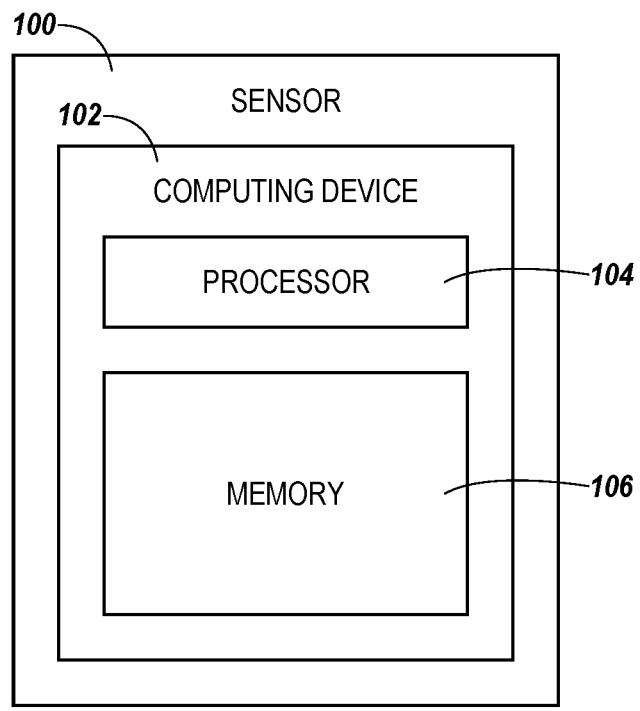
FIG. 1 is a block diagram of a sensor, in accordance with an embodiment of the present disclosure.

The present disclosure relates generally to semiconductor memory and methods, and more particularly, to secure sensor communication. An embodiment includes a processing resource, a memory having instructions executable by the processing resource, and a sensor coupled to the processing resource and the memory. Wherein, the sensor is configured to collect sensor data and generate and provide a sensor public key, a sensor public identification, and a sensor identification certificate to a sensor fusion unit.

For example, a vehicle can include many sensors and a large amount of data can be generated by these many sensors. The sensor data can be sent to a sensor fusion unit (e.g., vehicle control unit) to generate vehicle data that can be used to operate the vehicle. When sensor data is exchanged (e.g., transmitted and/or communicated), unreliable data can lead to a vehicle malfunctioning, which could result in injury or death to passengers of the vehicle. The exchange of unreliable data can be reduced by validating (e.g., authenticating and/or attesting) that the sensor data is untampered, by verifying that the identity of the sensor is authentic, and by encrypting the sensor data. While sensors used in connection with a vehicle are provided as examples herein, embodiments are not limited to sensors in connection with a vehicle.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 220 may reference element "20" in FIG. 1, and a similar element may be referenced as 320 in FIG. 3.

FIG. 1 is a block diagram of a sensor 100, in accordance with an embodiment of the present disclosure. The sensor 100 can be included in a vehicle (e.g., vehicle 330 in FIG. 3) and/or used by a vehicle. For example, the sensor 100 can be a radar sensor, a long-range radar sensor, a lidar sensor, an image sensor, or an ultrasonic sensor. In some examples, the sensor 100 can be located outside of the vehicle, in a different vehicle, on a roadway, or on a sign.

The sensor 100 can include a computing device 102 including logic and/or circuitry that can be used to perform the actions recited below (e.g., encrypt/decrypt, execute instructions, etc.). As shown, the computing device 102 can include a processing resource 104 (e.g., processor) to execute instructions and control functions of the computing device 102. The processing resource 104 can be coupled to a memory 106, such as a non-volatile flash memory, although embodiments are not so limited.

Figure 2:
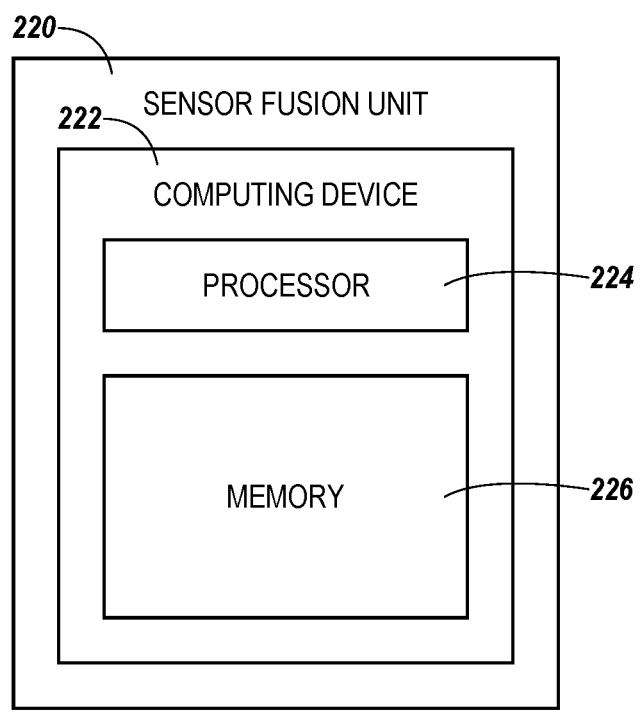
FIG. 2 is a block diagram of a sensor fusion unit, in accordance with an embodiment of the present disclosure.

FIG. 2 is a block diagram of a sensor fusion unit 220, in accordance with an embodiment of the present disclosure. The sensor fusion unit 220 can be included in a vehicle (e.g., vehicle 330 in FIG. 3) and/or used by a vehicle. The sensor fusion unit 220 can be configured to receive sensor data from one or more sensors (e.g., sensor 100 in FIG. 1). The sensor data can be integrated by the sensor fusion unit 220 to generate vehicle sensor data to be used in operating a vehicle.

The sensor fusion unit 220 can include a computing device 222 including logic and/or circuitry that can be used to perform the actions recited below (e.g., encrypt/decrypt, execute instructions, etc.). As shown, the computing device 222 can include a processing resource 224 (e.g., processor) to execute instructions and control functions of the computing device 222. For example, the computing device 222 can transmit a request to a particular sensor (e.g., sensor 100 in FIG. 1) among a number of sensors to which it may have access to, e.g., be communicatively coupled, to provide data. The processing resource 224 can be coupled to a memory 226, such as a non-volatile flash memory, although embodiments are not so limited.

Figure 3:
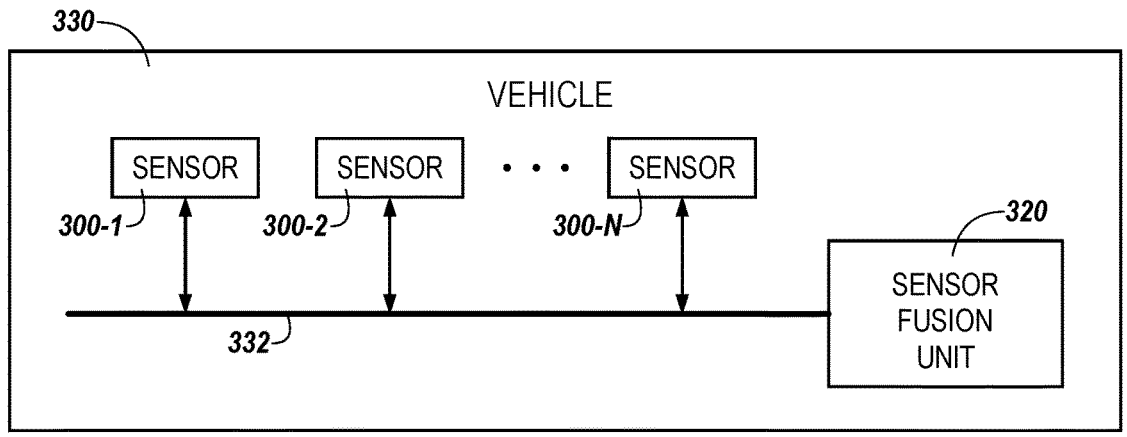
FIG. 3 is a block diagram of a vehicle including a sensor fusion unit and a number of sensors, in accordance with an embodiment of the present disclosure.

FIG. 3 is a block diagram of a vehicle 330 including a sensor fusion unit 320 and a number of sensors 300-1, 300-2, . . . , 300-N in accordance with an embodiment of the present disclosure. The vehicle 330 can be an autonomous vehicle, a traditional non-autonomous vehicle, or the like.

The sensor fusion unit 320 can include a computing device, as described above in association with FIG. 2. The sensor fusion unit 320 can be configured to receive sensor data from the number of sensors 300-1, 300-2, . . . , 300-N, integrate the sensor data, and generate vehicle sensor data to be used in operating the vehicle 330. In some examples, the sensor fusion unit 320 can receive sensor data from a number of other sensor fusion units, wherein each of the other sensor fusion units may also include a number of sensors 300-1, 300-2, . . . , 300-N.

In a number of embodiments, the sensor fusion unit 320 can transmit a request to the number of sensors 300-1, 300-2, 300-N to send sensor data to the sensor fusion unit 320. The request can include security data from the sensor fusion unit 320. The security data from the sensor fusion unit 320 can include a sensor fusion unit public key, a sensor fusion unit public identification, and a sensor fusion unit identification certificate, as will be described further in association with FIGS. 4-9. The request and security data from the sensor fusion unit 320 can be transmitted in such a way as to prevent a hacker or nefarious device from intercepting or creating the request in order to negatively affect the vehicle 330, passengers, and/or bystanders.

The number of sensors 300-1, 300-2, . . . , 300-N can receive the request to send sensor data from the sensor fusion unit 320. The number of sensors 300-1, 300-2, . . . , 300-N can include, but are not limited to, a radar sensor, a long-range radar sensor, a lidar sensor, an image sensor, or an ultrasonic sensor, for example. Although the number of sensors 300-1, 300-2, . . . , 300-N are included in the vehicle 330 as illustrated in FIG. 3, sensors are not limited to being on a particular vehicle. For example, the sensor data can additionally be received to the sensor fusion unit 320 from a different vehicle, a roadway sensor, and/or a sign sensor outside of vehicle 330.

The number of sensors 300-1, 300-2, . . . , 300-N can send the sensor data upon receiving the request from the sensor fusion unit 320 and/or upon verifying from the security data that the sensor fusion unit 320 is authentic and the request has not been corrupted. Such verification can be performed using the techniques described in connection with FIGS. 4-9. In some examples, the number of sensors 300-1, 300-2, . . . , 300-N can send the sensor data after a particular time period has passed, after a particular amount of data has been collected, and/or in response to the number of sensors 300-1, 300-2, . . . , 300-N and/or the sensor fusion unit 320 turning on (e.g., powering on).

The number of sensors 300-1, 300-2, . . . , 300-N can send security data to the sensor fusion unit 320. The security data from each of the sensors 300-1, 300-2, . . . , 300-N can include a sensor public key, a sensor public identification, and a sensor identification certificate, as will be described further in association with FIGS. 4-9. Sensor public key, discussed in connection with FIG. 4, can be used by the sensor fusion unit 320 to encrypt data sent to a particular sensor 300-1, 300-2, . . . , 300-N. The sensor data and security data from the number of sensors 300-1, 300-2, . . . , 300-N can be transmitted in such a way as to prevent a hacker or nefarious device from intercepting, modifying, or creating the sensor data in order to negatively affect the vehicle 330, passengers, and/or bystanders.

In some examples, the sensor data can be used in operating the vehicle 330 once the security data is verified by the sensor fusion unit 320. For example, the security data can be used to verify, as described in connection with FIGS. 4-9, that the sensors 300-1, 300-2, . . . , 300-2 are authentic and the sensor data has not been corrupted.

The sensor fusion unit 320 can receive the sensor data and security data from the number of sensors 300-1, 300-2, . . . , 300-N and the number of sensors 300-1, 300-2, . . . , 300-N can receive the request and security data from the sensor fusion unit 320 via an interface 332. The interface 332 can be a wireless interface (e.g., transceiver operating according to a particular wireless protocol (Bluetooth®, Wi-Fi, 5G, etc.)), a serial advanced technology attachment (SATA) physical interface, a peripheral component interconnect express (PCIe) physical interface, a universal serial bus (USB) physical interface, or a small computer system interface (SCSI), among other physical connectors and/or interfaces.

Figure 4:
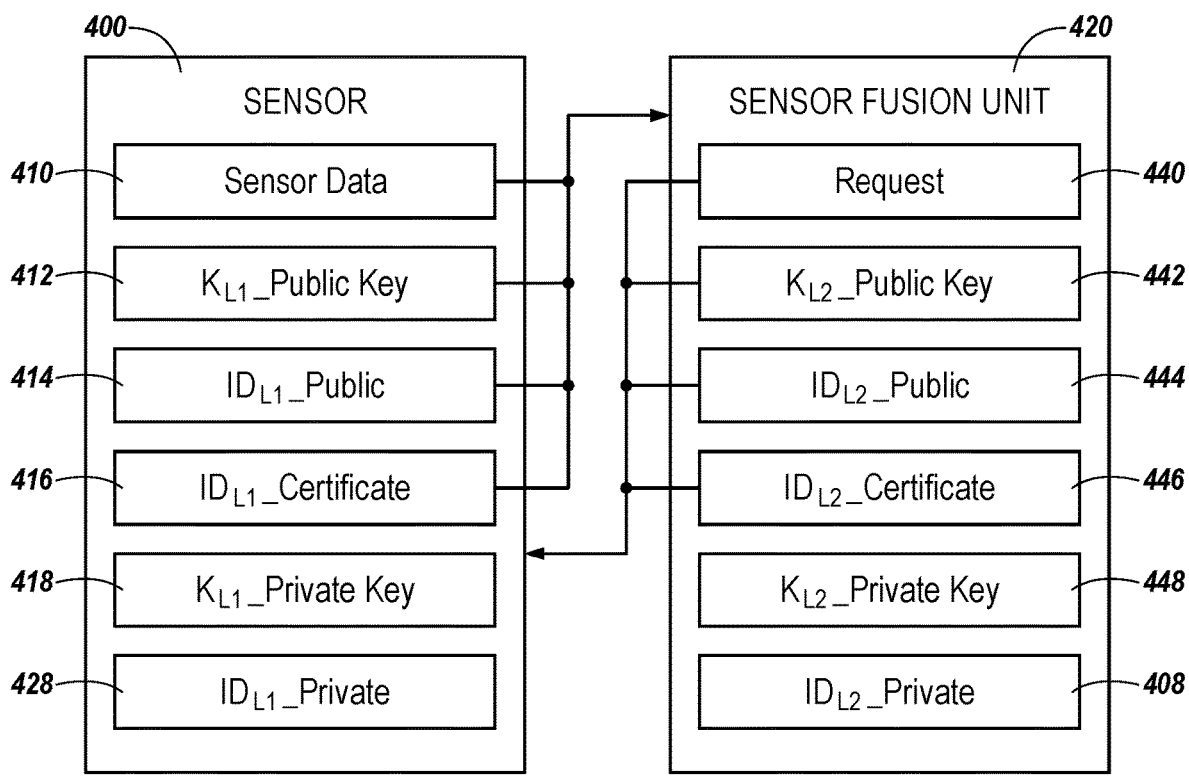
FIG. 4 is an illustration of an exchange of data between a sensor and a sensor fusion unit, in accordance with an embodiment of the present disclosure.

FIG. 4 is an illustration of an exchange of data between a sensor 400 and a sensor fusion unit 420, in accordance with an embodiment of the present disclosure. The data transmitted by the sensor fusion unit 420 and received by the sensor 400 can include a public key ("$K_{L2}$ Public key") 442, a public identification ("$ID_{L2}$ Public") 444, and an identification certificate ("ID Certificate of $L_2$") 446. The data transmitted by the sensor 400 and received by the sensor fusion unit 420 can include a public key ("$K_{L1}$ Public key") 412, a public identification ("$ID_{L1}$ Public") 414, and an identification certificate ("ID Certificate of $L_1$") 416.

The public identification 444 can be used to determine an identity of the sensor fusion unit 420 and the identification certificate 446 can be used to verify that the identity of the sensor fusion unit 420 is authenticated. In some examples, the sensor 400 can ignore a request 440 from the sensor fusion unit 420, in response to the sensor fusion unit 420 identity being undetermined and/or unauthenticated.

The public key 412 can be used to encrypt data to be sent to the sensor 400 and a private identification ("$ID_{L2}$ Private") 408 can be used as a key input into an encryptor to encrypt the data. For example, the public key 412 and the private identification 408 can be used in encrypting a request 440 for sensor data 410 from sensor 400. The sensor 400 can decrypt data, including the request 440 received from the sensor fusion unit 420, using its own private key ($K_{L1}$ Private key) 418 (which is private to only that sensor), as will be described further in association with FIGS. 5-9.

The public identification 414 can be used to determine an identity of the sensor 400 and the identification certificate 416 can be used to verify that the identity of the sensor 400 is authenticated. In some examples, the sensor fusion unit 420 can ignore sensor data 410 from the sensor 400, in response to the sensor 400 identity being undetermined and/or unauthenticated.

The public key 442 can be used to encrypt data to be sent to the sensor fusion unit 420 and the private identification ("$ID_{L1}$ Private") 428 can be used as a key input into an encryptor to encrypt the data. For example, the public key 442 and the private identification 428 can be used in encrypting sensor data 410 for transmitting to the sensor fusion unit 420. The sensor fusion unit 420 can decrypt data, including the sensor data 410, received from the sensor 400 using its own private key ($K_{L2}$ Private key) 448 (which is private to only that sensor fusion unit), as will be described further in association with FIGS. 5-9.

In an example, data exchanged between the sensor fusion unit 420 and the sensor 400 can have a freshness used by the other. As an example, in receipt of the data (e.g., request 440) sent by the sensor fusion unit 420 to the sensor 400, the data can be altered at each of a particular time frame or for a particular amount of data being sent. Similarly, in receipt of the data (e.g., sensor data 410) sent by the sensor 400 to the sensor fusion unit 420, the data can be altered at each of a particular time frame or for a particular amount of data being sent. This can prevent a hacker from intercepting previously sent data and sending the same data again to result in the same outcome. If the data has been slightly altered but still indicates a same instruction, the hacker may send the identical information at a later point in time and the same instruction would not be carried out due to the recipient expecting the altered data to carry out the same instruction.

The data exchanged between the sensor fusion unit 420 and the sensor 400 can be performed using a number of encryption and/or decryption methods as described below. The securing of the data can insure that nefarious activity is prevented from interfering with the sensor fusion unit 420 and/or sensor data 400 provided to the sensor fusion unit 420 and/or the sensor 400.

Figure 5:
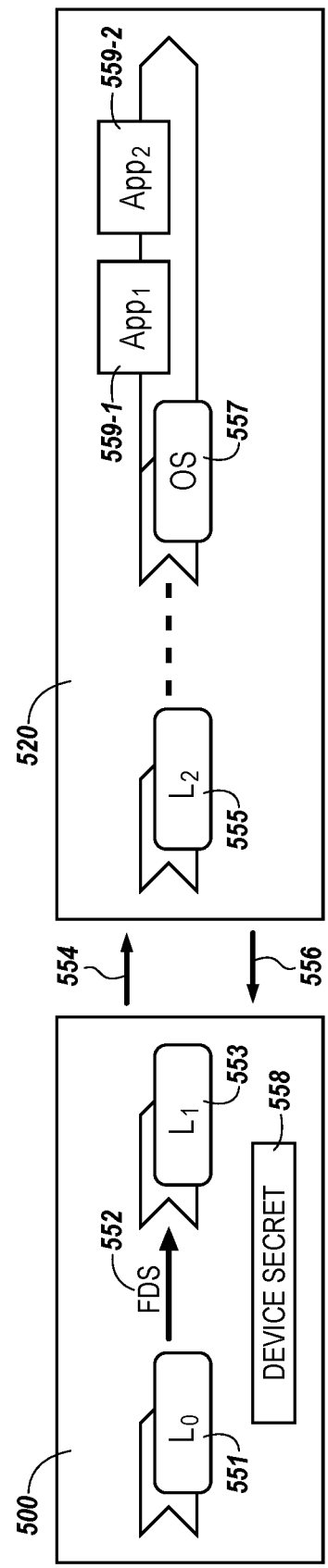
FIG. 5 is a block diagram of an example system including a sensor and a sensor fusion unit in accordance with an embodiment of the present disclosure.

FIG. 5 is a block diagram of an example system including a sensor fusion unit 520 and a sensor 500 in accordance with an embodiment of the present disclosure. Sensor fusion unit 520 and sensor 500 can be, for example, sensor fusion unit 420 and sensor 400, respectively, as previously described in connection with FIG. 4.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 5, Layer 0 ("L0") 551 and Layer 1 ("L1") 553 are within the sensor 500. Layer 0 551 can provide a Firmware Derivative Secret (FDS) key 552 to Layer 1 553. The FDS key 552 can describe the identity of code of Layer 1 553 and other security relevant data. In an example, a particular protocol (such as robust internet of things (RIOT) core protocol) can use the FDS 552 to validate code of Layer 1 553 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 can be used to create the FDS 552 and be stored in memory (e.g., memory 106 in FIG. 1) of the sensor 500.

The sensor 500 can transmit data, as illustrated by arrow 554, to the sensor fusion unit 520. The transmitted data can include a sensor identification that is public (e.g., public identification 414 in FIG. 4), a sensor certificate (e.g., identification certificate 416 in FIG. 4), and/or a sensor public key (e.g., public key 412 in FIG. 4). Layer 2 ("L2") 555 of the sensor fusion unit 520 can receive the transmitted data and execute the data in operations of the operating system ("OS") 557 and on a first application 559-1 and a second application 559-2.

In an example operation, the sensor 500 can read the device secret 558, hash an identity of Layer 1 553, and perform a calculation including:

$$K_{L1}=KDF[Fs(s),\text{Hash}(\text{"immutable information"})]$$

where $K_{L1}$ is a sensor public key, KDF (e.g., KDF defined in the National Institute of Standards and Technology (NIST) Special Publication 800-108) is a key derivation function (i.e., HMAC-SHA256), and Fs(s) is the device secret 558. FDS 552 can be determined by performing:

$$FDS=HMAC\text{-}SHA256[Fs(s),SHA256(\text{"immutable information"})]$$

Likewise, the sensor fusion unit 520 can transmit data, as illustrated by arrow 556, including a sensor fusion unit identification that is public (e.g., public identification 444 in FIG. 4), a sensor fusion unit identification certificate (e.g., identification certificate 446), and/or a sensor fusion unit public key (e.g., public key 442 in FIG. 4).

Figure 6:
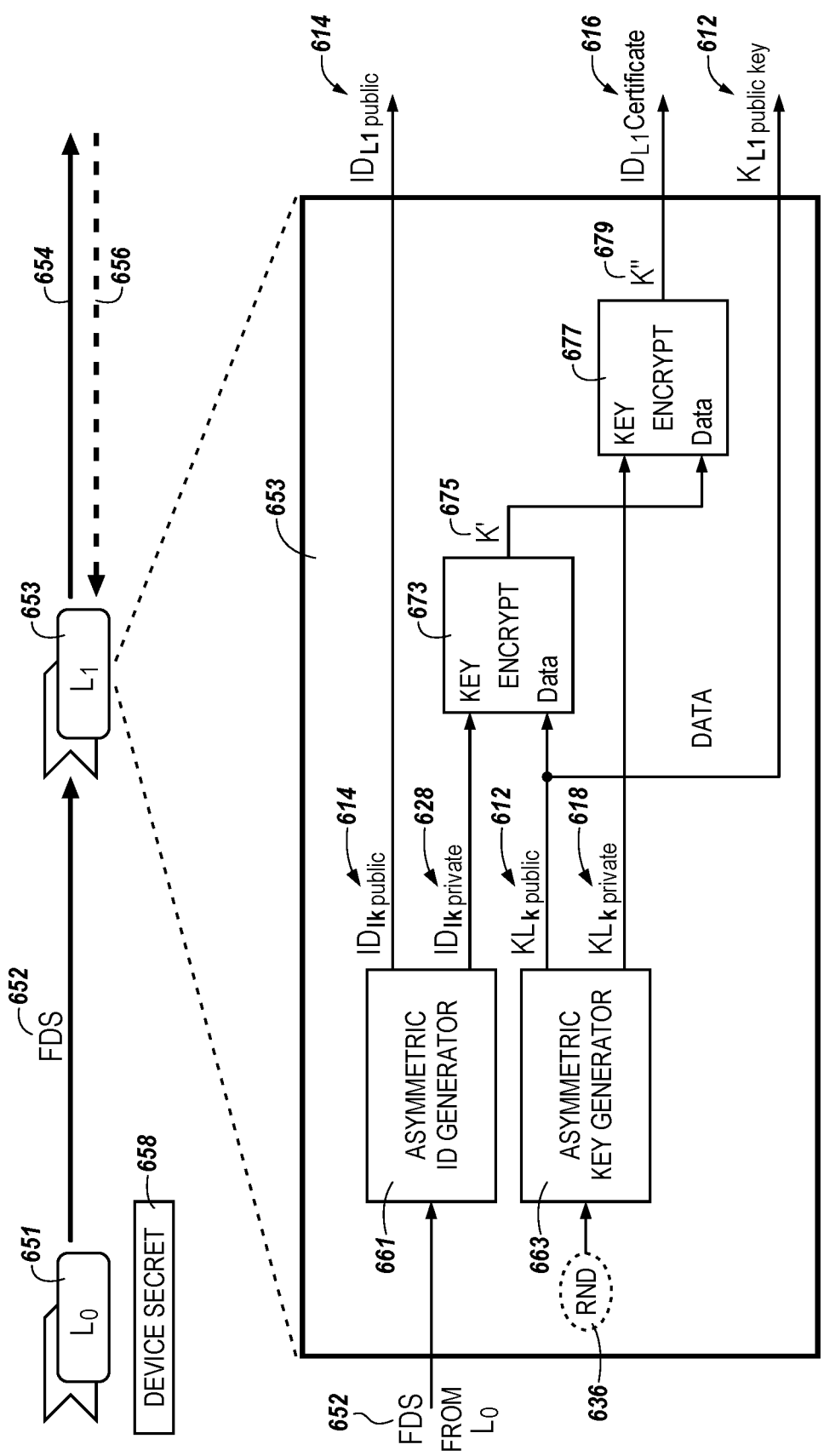
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 is an example of a determination of the parameters including the sensor public identification (e.g., sensor public identification 414 in FIG. 4), the sensor identification certificate (e.g., sensor identification certificate 416 in FIG. 4), and the sensor public key (e.g., sensor public key 412 in FIG. 4) that are then sent, indicated by arrow 654, to Layer 2 (e.g., Layer 2 555) of a sensor fusion unit (e.g., sensor fusion unit 520 in FIG. 5). Layer 0 ("L0") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("$ID_{lk\ public}$") 614 and a private identification ("$ID_{lk\ private}$") 628. In the abbreviated "$ID_{lk\ public}$," the "lk" indicates Layer k (in this example Layer 1), and the "public" indicates that the identification is openly shared. The public identification ("$ID_{L1\ public}$") 614 is illustrated as shared by the arrow extending to the right and outside of Layer 1 653 of the sensor (e.g., sensor 500 in FIG. 5). The generated private identification 628 is used as a key input into an encryptor 673. The encryptor 673 can be any processor, computing device, etc. used to encrypt data.

Layer 1 653 of a sensor (e.g., sensor 500 in FIG. 5) can include an asymmetric key generator 663. In some examples, a random number generator (RND) 636 can optionally input a random number into the asymmetric key generator 663. The asymmetric key generator 663 can generate a public key ("$K_{Lk\ public}$") 612 (referred to as a sensor public key) and a private key ("$K_{LK\ private}$") 618 (referred to as a sensor private key) associated with a sensor (e.g., sensor 500 in FIG. 5). The sensor public key 612 can be an input (as "data") into the encryptor 673. The encryptor 673 can generate a result K' 675 using the inputs of the sensor private identification 628 and the sensor public key 612. The sensor private key 618 and the result K' 675 can be input into an additional encryptor 677, resulting in output K" 679. The output K" 679 is the sensor certificate ("$ID_{L1}$ certificate") 616 transmitted to the Layer 2 (e.g., layer 2 555 in FIG. 5). The sensor certificate 616 can provide an ability to verify and/or authenticate an origin of data sent from a sensor. As an example, data sent from the sensor can be associated with an identity of the sensor by verifying the certificate, as will be described further in association with FIG. 8. Further, the sensor public key ("$K_{L1\ public\ key}$") 612 can be transmitted to Layer 2. Therefore, the public identification 614, the identification certificate 616, and the sensor public key 612 of a Layer 1 653 of a sensor can be transmitted to Layer 2 of a sensor fusion unit (e.g., sensor fusion unit 520 in FIG. 5).

Figure 7:
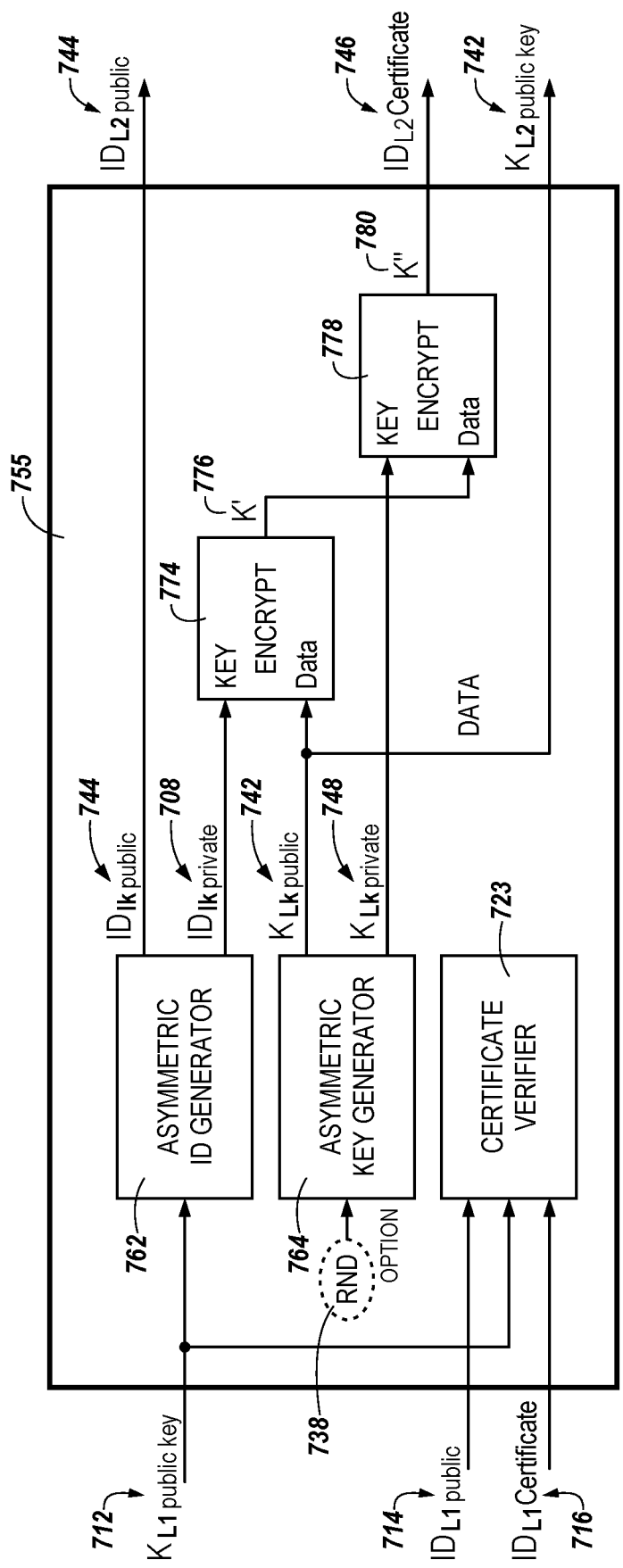
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 illustrates a Layer 2 755 of a sensor fusion unit (e.g., sensor fusion unit 520 in FIG. 5) generating a sensor fusion unit identification ("$ID_{L2\ public}$") 744, a sensor fusion unit certificate ("$ID_{L2\ Certificate}$") 746, and a sensor fusion unit public key ("$K_{L2\ public\ key}$") 742.

The sensor public key ("$K_{L1\ public\ key}$") 712 transmitted from Layer 1 of the sensor (e.g., sensor 500 in FIG. 5) to Layer 2 755 of a sensor fusion unit (eg., sensor fusion unit 520 in FIG. 5), as described in FIG. 6, is used by an asymmetric ID generator 762 of the sensor fusion unit to generate a public identification ("$ID_{lk\ public}$") 744 and a private identification ("$ID_{lk\ private}$") 708 of the sensor fusion unit. In the abbreviated "$ID_{lk\ public}$," the "lk" indicates Layer k (in this example Layer 2), and the "public" indicates that the identification is openly shared. The public identification 744 is illustrated as shared by the arrow extending to the right and outside Layer 2 755. The generated private identification 708 is used as a key input into an encryptor 774.

As shown in FIG. 7, the sensor certificate 716 and sensor identification 714, along with the sensor public key 712, are used by a certificate verifier 723. The certificate verifier 723 can verify the sensor certificate 716 received from a sensor (e.g., sensor 500 in FIG. 5), and determine, in response to the sensor certificate 716 being verified or not being verified, whether to accept or discard data received from the sensor. Further details of verifying the sensor certificate 716 are described in connection with FIG. 8.

Layer 2 755 of the sensor fusion unit (e.g., sensor fusion unit 520 in FIG. 5) can include an asymmetric key generator 764. In at least one example, a random number generator (RND) 738 can optionally input a random number into the asymmetric key generator 764. The asymmetric key generator 764 can generate a public key ("$K_{Lk\ public}$") 742 (referred to as a sensor fusion unit public key) and a private key ("$K_{LK\ private}$") 748 (referred to as a sensor fusion unit private key) associated with a sensor fusion unit such as sensor fusion unit 520 in FIG. 5. The sensor fusion unit public key 742 can be an input (as "data") into the encryptor 774. The encryptor 774 can generate a result K' 776 using the inputs of the sensor fusion unit private identification 708 and the sensor fusion unit public key 742. The sensor fusion unit private key 748 and the result K' 776 can be input into an additional encryptor 778, resulting in output K" 780. The output K" 780 is the sensor fusion unit identification certificate ("$ID_{L2}$ certificate") 746 transmitted back to the Layer 1 (e.g., Layer 1 553 in FIG. 5). The sensor fusion unit identification certificate 746 can provide an ability to verify and/or authenticate an origin of data sent from an apparatus. As an example, data sent from the sensor fusion unit can be associated with an identity of the sensor fusion unit by verifying the certificate, as will be described further in association with FIG. 8. Further, the sensor fusion unit public key ("$K_{L2\ public\ key}$") 742 can be transmitted to Layer 1. Therefore, the public identification 744, the identification certificate 746, and the public key 742 of the sensor fusion unit can be transmitted to Layer 1 of a sensor (e.g., sensor 500 in FIG. 5).

In an example, in response to a sensor fusion unit (e.g., sensor fusion unit 520 in FIG. 5) receiving a public key 712 from a sensor (e.g., sensor 500 in FIG. 5), the sensor fusion unit can encrypt data to be sent to the sensor using the sensor public key 712. Vice versa, the sensor can encrypt data to be sent to the sensor fusion unit using the sensor fusion unit public key 742. In response to the sensor fusion unit receiving data encrypted using the sensor fusion unit public key 742, the sensor fusion unit can decrypt the data using its own sensor fusion unit private key 748. Likewise, in response to the sensor receiving data encrypted using the sensor public key 712, the sensor can decrypt the data using its own sensor private key 718. As the sensor fusion unit private key 748 is not shared with another device outside the sensor fusion unit and the sensor private key 718 is not shared with another device outside the sensor, the data sent to the sensor fusion unit and the sensor remains secure.

Figure 8:
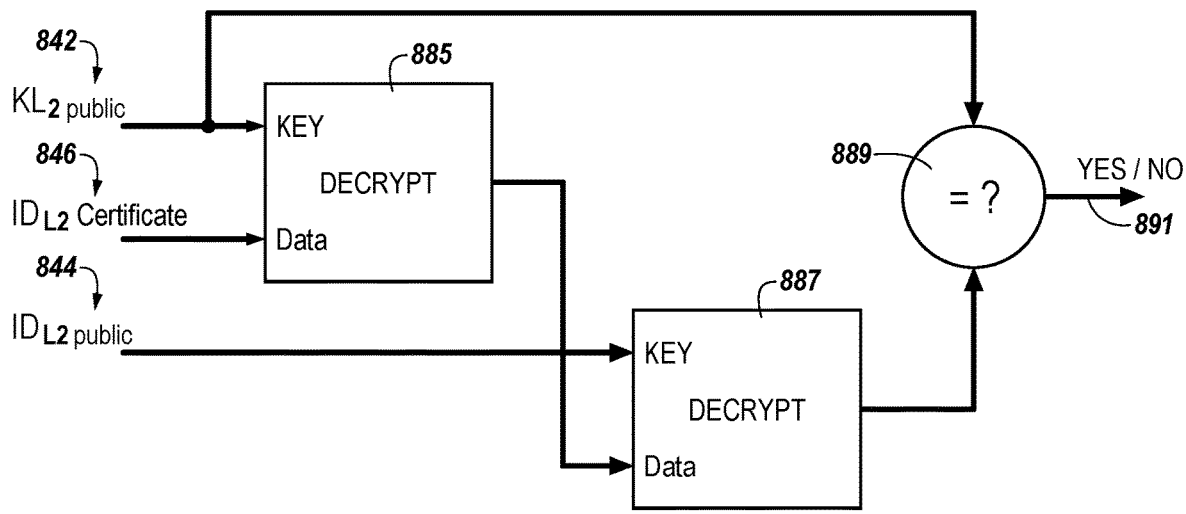
FIG. 8 is a block diagram of an example process to verify a certificate in accordance with an embodiment of the present disclosure.

FIG. 8 is a block diagram of an example process to verify a certificate in accordance with an embodiment of the present disclosure. In the illustrated example of FIG. 8, a public key 842, a certificate 846, and a public identification 844 is provided from a sensor fusion unit (e.g., from Layer 2 555 of sensor fusion unit 520 in FIG. 5). The data of the certificate 846 and the sensor fusion unit public key 842 can be used as inputs into a decryptor 885. The decryptor 885 can be any processor, computing device, etc. used to decrypt data. The result of the decryption of the certificate 846 and the sensor fusion unit public key 842 can be used as an input into a secondary decryptor 887 along with the public identification 844, result in an output. The sensor fusion unit public key 842 and the output from the decryptor 887 can indicate, as illustrated at 889, whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
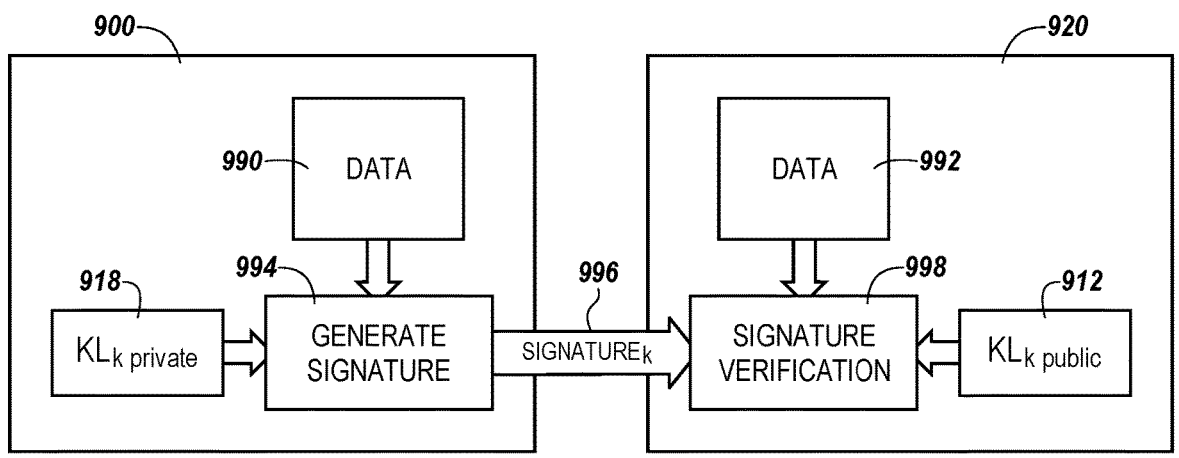
FIG. 9 is a block diagram of an example process to verify a signature in accordance with an embodiment of the present disclosure.

FIG. 9 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A sensor 900 (e.g., sensor 500 in FIG. 5) can send data 990 to a sensor fusion unit 920 (e.g., sensor fusion unit 520 in FIG. 5). The sensor 900 can generate, at 994, a signature 996 using a sensor private key 918. The signature 996 can be transmitted to the sensor fusion unit 920. The signature 996 can be transmitted to the sensor fusion unit 920 every time the sensor 900 communicates with the sensor fusion unit 920 or periodically. To improve and/or ensure performance in terms of transmission speed, the signature 996 can be transmitted and/or received periodically. For example, a transmission with a signature 996 can be longer, requiring more bandwidth than a transmission without a signature 996. The sensor 900 and/or the sensor fusion unit 920 can determine how often a signature 996 is transmitted and/or received. For example, the sensor 900 can choose to send a signature 996 when its data traffic (e.g., data transmission rate) is lower than average traffic and/or after a threshold number of data transmissions are sent by the sensor 900. In some examples, the sensor fusion unit 920 can choose to receive a signature 996 when its data traffic is lower than average traffic and/or after a threshold number of data transmissions are received from the sensor 900.

The sensor fusion unit 920 can verify, at 998, using data 992 and the sensor public key 912 previously received. The signature verification operates by using a private key to encrypt the signature and a public key to decrypt the signature. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the sensor fusion unit and/or sensor can verify a digital signature by using an internal cryptography process (e.g., Elliptical Curve Digital signature (ECDSA) or a similar process.

Figure 10:
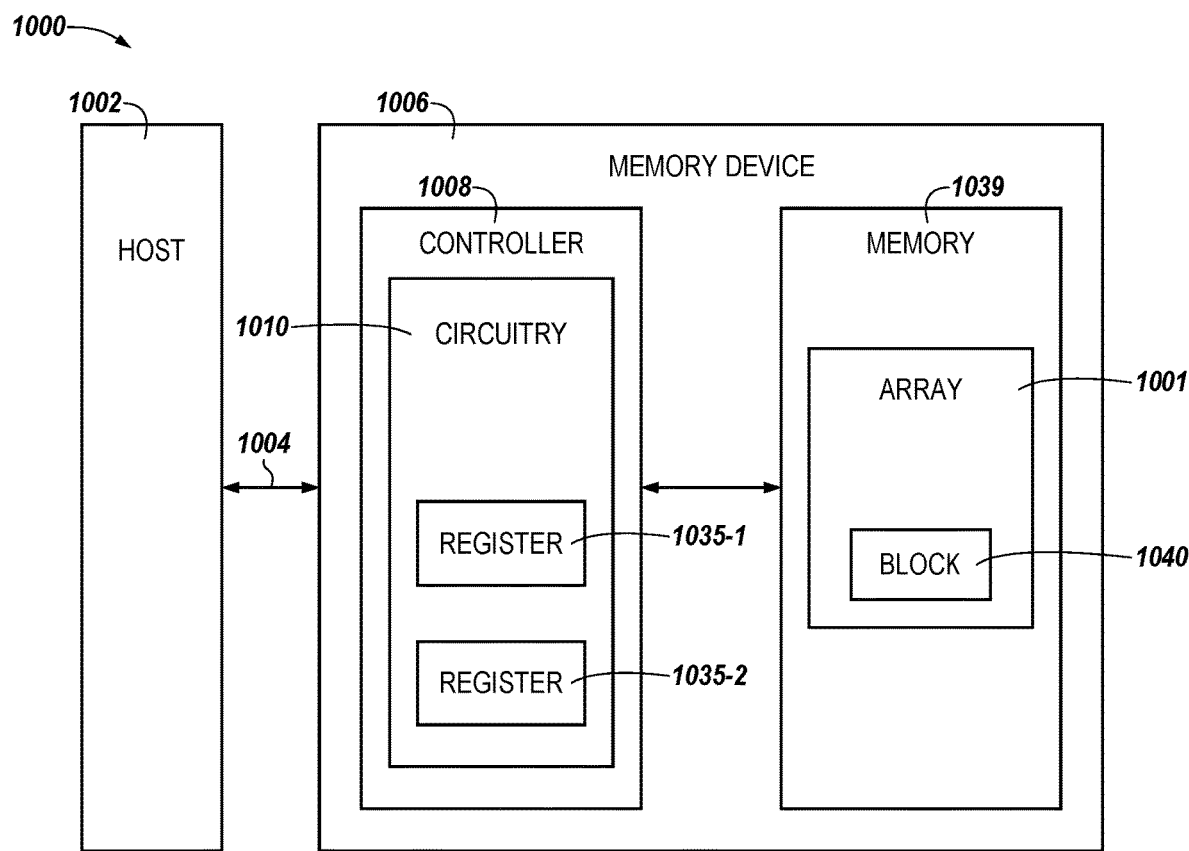
FIG. 10 is a block diagram of a computing system including a host and an apparatus in the form of a memory device in accordance with an embodiment of the present disclosure.

FIG. 10 is a block diagram of a computing system 1000 including a host 1002 and an apparatus in the form of a memory device 1006 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 1000 can include a number of memory devices analogous to memory device 1006.

In the embodiment illustrated in FIG. 10, memory device 1006 can include a memory 1039 having a memory array 1001. Memory array 1001 can be a secure array, as will be further described herein. Although one memory array 1001 is illustrated in FIG. 10, memory 1039 can include any number of memory arrays analogous to memory array 1001.

As illustrated in FIG. 10, host 1002 can be coupled to the memory device 1006 via interface 1004. Host 1002 and memory device 1006 can communicate (e.g., send commands and/or data) on interface 1004. Host 1002 and/or memory device 1006 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 1004 can be in the form of a standardized physical interface. For example, when memory device 1006 is used for information storage in computing system 1000, interface 1004 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 1004 can provide an interface for passing control, address, information (e.g., data), and other signals between memory device 1006 and a host (e.g., host 1002) having compatible receptors for interface 1004.

Memory device 1006 includes controller 1008 to communicate with host 1002 and with memory 1039 (e.g., memory array 1001). For instance, controller 1008 can send commands to perform operations on memory array 1001, including operations to sense (e.g., read), program (e.g., write), move, and/or erase data, among other operations.

Controller 1008 can be included on the same physical device (e.g., the same die) as memory 1039. Alternatively, controller 1008 can be included on a separate physical device that is communicatively coupled to the physical device that includes memory 1039. In an embodiment, components of controller 1008 can be spread across multiple physical devices (e.g., some components on the same die as the memory, and some components on a different die, module, or board) as a distributed controller.

Host 1002 can include a host controller (not shown FIG. 10) to communicate with memory device 1006. The host controller can send commands to memory device 1006 via interface 1004. The host controller can communicate with memory device 1006 and/or the controller 1008 on the memory device 1006 to read, write, and/or erase data, among other operations. Further, in an embodiment, host 1002 can be an IoT enabled device, as previously described herein, having IoT communication capabilities.

Controller 1008 on memory device 1006 and/or the host controller on host 1002 can include control circuitry and/or logic (e.g., hardware and firmware). In an embodiment, controller 1008 on memory device 1006 and/or the host controller on host 1002 can be an application specific integrated circuit (ASIC) coupled to a printed circuit board including a physical interface. Also, memory device 1006 and/or host 1002 can include a buffer of volatile and/or non-volatile memory and a number of registers.

For example, as shown in FIG. 10, memory device can include circuitry 1010. In the embodiment illustrated in FIG. 10, circuitry 1010 is included in controller 1008. However, embodiments of the present disclosure are not so limited. For instance, in an embodiment, circuitry 1010 may be included in (e.g., on the same die as) memory 1039 (e.g., instead of in controller 1008). Circuitry 1010 can comprise, for instance, hardware, firmware, and/or software.

Circuitry 1010 can generate a block 1040 in a block chain for validating (e.g., authenticating and/or attesting) the data stored in memory 1039 (e.g., in memory array 1001). The block 1040 can include a cryptographic hash of (e.g., a link to) the previous block in the block chain, and a cryptographic hash of (e.g., identifying) the data stored in memory array 1001. The block 1040 can also include a header having a timestamp indicating when the block was generated. Further, the block 1040 can have a digital signature associated therewith that indicates the block is included in the block chain.

The cryptographic hash of the data stored in memory array 1001, and/or the cryptographic hash of the previous block in the block chain, can comprise, for instance, a SHA-256 cryptographic hash. Further, the cryptographic hash of the data stored in memory array 1001, and the cryptographic hash of the previous block in the block chain, can each respectively comprise 256 bytes of data.

The cryptographic hash of the data stored in memory array 1001 can be generated (e.g., calculated), for example, by circuitry 1010. In such an example, the cryptographic hash of the data stored can be internally generated by memory device 1006 without having external data moving on interface 1004. As an additional example, the cryptographic hash of the data can be communicated from an external entity. For instance, host 1002 can generate the cryptographic hash of the data stored in memory array 1001, and send the generated cryptographic hash to memory device 1006 (e.g., circuitry 1010 can receive the cryptographic hash of the data stored in memory array 1001 from host 1002).

The digital signature associated with the block 1040 can be generated (e.g., calculated), for example, by circuitry 1010 based on (e.g., responsive to) an external command, such as a command received from host 1002. For instance, the digital signature can be generated using symmetric or asymmetric cryptography. As an additional example, host 1002 can generate the digital signature, and send (e.g. provide) the generated digital signature to memory device 1006 (e.g., circuitry 1010 can receive the digital signature from host 1002).

As shown in FIG. 10, the block 1040, as well as the digital signature associated with block 1040, can be stored in memory array 1001. For example, the block 1040 can be stored in a portion of memory array 1001 that is inaccessible to a user of memory device 1006 and/or host 1002 (e.g., in a "hidden" region of memory array 1001). Storing the block 1040 in memory array 1001 can simplify the storage of the block by, for example, removing the need for software storage management for the block.

In an embodiment, memory array 1001 (e.g., a subset of array 1001, or the whole array 1001) can be a secure array (e.g., an area of memory 1039 to be kept under control). For example, the data stored in memory array 1001 can include sensitive (e.g., non-user) data, such as host firmware and/or code to be executed for sensitive applications. In such an embodiment, a pair of non-volatile registers can be used to define the secure array. For example, in the embodiment illustrated in FIG. 10, circuitry 1010 includes registers 1035-1 and 1035-2 that can be used to define the secure array. For instance, register 1035-1 can define the address (e.g., the starting LBA of the data) of the secure array, and register 1035-2 can define the size (e.g., the ending LBA of the data) of the secure array. Once the secure array has been defined, circuitry 1010 can generate (e.g., calculate) a cryptographic hash associated with the secure array, which may be referred to herein as a golden hash, using authenticated and antireplay protected commands (e.g., so that only memory device 1006 knows the golden hash, and only memory device 1006 is capable of generating and updating it). The golden hash may be stored in inaccessible portion of memory array 1001 (e.g., the same inaccessible portion in which block 1040 is stored), and can be used during the process of validating the data of the secure array, as will be further described herein.

Memory device 1006 (e.g., circuitry 1010) can send, via interface 1004, the block 1040, along with the digital signature associated with block 1040, to host 1002 for validation of the data stored in memory array 1001. For example, circuitry 1010 can sense (e.g., read) the block 1040 stored in memory array 1001, and send the sensed block to host 1002 for validation of the data stored in array 1001, responsive to a powering (e.g., a powering on and/or powering up) of memory device 1006. As such, a validation of the data stored in memory array 1001 can be initiated (e.g., automatically) upon the powering of memory device 1006.

As an additional example, circuitry 1010 can send the block 1040, along with the digital signature associated with block 1040, to host 1002 upon an external entity, such as host 1002, initiating a validation of the data stored in memory array 1001. For instance, host 1002 can send a command to memory device 1006 (e.g., circuitry 1010) to sense the block 1040, and circuitry 1010 can execute the command to sense the block 1040, and send the sensed block to host 1002 for validation of the data stored in array 1001, responsive to receipt of the command.

Upon receiving the block 1040, host 1002 can validate (e.g., determine whether to validate) the data stored in memory array 1001 using the received block. For example, host 1002 can use the cryptographic hash of the previous block in the block chain and the cryptographic hash of the data stored in memory array 1001 to validate the data. Further, host 1002 can validate the digital signature associated with the block 1040 to determine the block is included (e.g., is eligible to be included) in the block chain. As used herein, validating the data stored in memory array 1001 can include, and/or refer to, authenticating and/or attesting that the data is genuine (e.g., is the same as originally programmed), and has not been altered by hacking activity or other unauthorized changes.

In embodiments in which memory array 1001 is a secure array, the golden hash previously described herein may also be used to validate the data stored in memory array 1001. For example, a run-time cryptographic hash can be generated (e.g., calculated), and compared with the golden hash. If the comparison indicates the run-time and golden hashes match, it can be determined that the secure array has not been altered, and therefore the data stored therein is valid. If, however, the comparison indicates the run-time and golden hashes do not match, this may indicate that the data stored in the secure array has been changed (e.g., due to a hacker or a fault in the memory), and this can be reported to host 1002.

After the validation of the data stored in memory array 1001, circuitry 1010 can generate an additional (e.g., the next) block in the block chain for validating the data stored in memory array 1001, in a manner analogous to which the block 1040 was generated. For example, this additional block can include a cryptographic hash of block 1040, which has now become the previous block in the block chain, and a new cryptographic hash of the data stored in memory array 1001. Further, this additional block can include a header having a timestamp indicating when this block was generated, and can have a digital signature associated therewith that indicates this block is included in the block chain. Further, in embodiments in which memory array 1001 is a secure array, an additional (e.g., new) golden hash can be generated.

The additional block, as well as the digital signature associated with the additional block, and the additional golden hash, can be stored in memory array 1001. For example, the additional block can replace block 1040 (e.g., the previous block) in memory array 1001. The additional block, digital signature, and additional golden hash can then be used by host 1002 to validate the data stored in memory array 1001, in a manner analogous to that previously described herein for block 1040. Additional blocks in the block chain can continue to be generated by circuitry 1010, and used by host 1002 to validate the data stored in memory array 1001, in such manner throughout the lifetime of memory device 1006.

The embodiment illustrated in FIG. 10 can include additional circuitry, logic, and/or components not illustrated so as not to obscure embodiments of the present disclosure. For example, memory device 1006 can include address circuitry to latch address signals provided over I/O connectors through I/O circuitry. Address signals can be received and decoded by a row decoder and a column decoder, to access memory array 1001. Further, memory device 1006 can include a main memory, such as, for instance, a DRAM or SDRAM, that is separate from and/or in addition to memory array 1001. An example further illustrating additional circuitry, logic, and/or components of memory device 1006 will be further described herein (e.g., in connection with FIG. 10).

Figure 11:
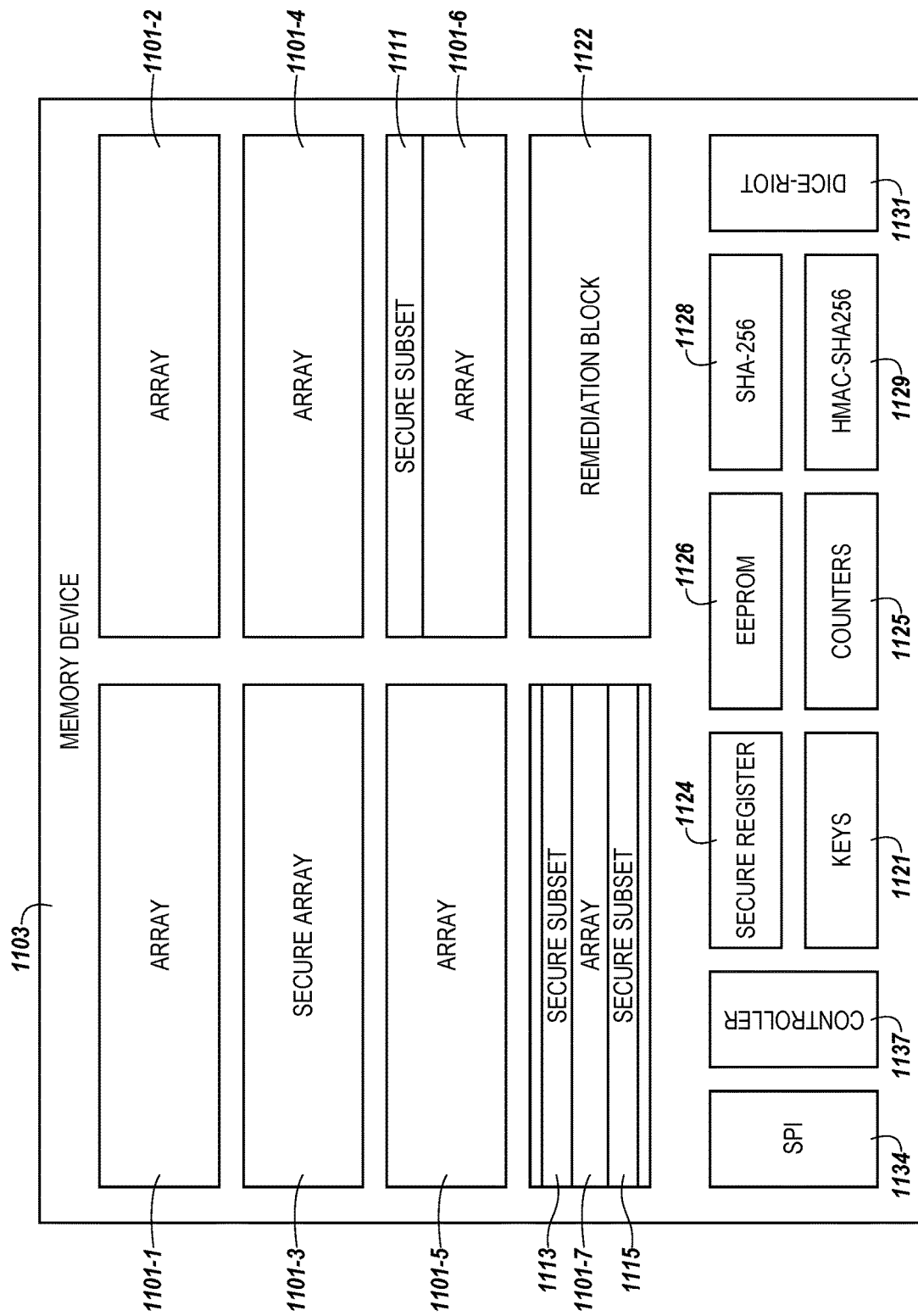
FIG. 11 is a block diagram of an example memory device in accordance with an embodiment of the present disclosure.

FIG. 11 is a block diagram of an example memory device 1103 in accordance with an embodiment of the present disclosure. Memory device 1103 can be, for example, a sensor (e.g., sensor 100 in FIG. 1), a component of a sensor, a sensor fusion unit (e.g., sensor fusion unit 220 in FIG. 2), or a component of a sensor fusion unit, among other such devices. Further, memory device 1103 can be a same memory device as memory device 1006 described in association with FIG. 10.

As shown in FIG. 11, memory device 1103 can include a number of memory arrays 1101-1 through 1101-7. Further, in the example illustrated in FIG. 11, memory array 1101-3 is a secure array, subset 1111 of memory array 1101-6 comprises a secure array, and subsets 1113 and 1115 of memory array 1101-7 comprise a secure array. Subsets 1111, 1113, and 1115 can each include, for instance, 4 kilobytes of data. However, embodiments of the present disclosure are not limited to a particular number or arrangement of memory arrays or secure arrays.

As shown in FIG. 11, memory device 1103 can include a remediation (e.g., recovery) block 1122. Remediation block 1122 can be used as a source of data in case of errors (e.g., mismatches) that may occur during operation of memory device 1103. Remediation block 1122 may be outside of the area of memory device 1103 that is addressable by a host.

As shown in FIG. 11, memory device 1103 can include a serial peripheral interface (SPI) 1134 and a controller 1137. Memory device 1103 can use SPI 1134 and controller 1137 to communicate with a host and memory arrays 1101-1 through 1101-7.

As shown in FIG. 11, memory device 1103 can include a secure register 1124 for managing the security of memory device 1103. For example, secure register 1124 can configure, and communicate externally, to an application controller. Further, secure register 1124 may be modifiable by an authentication command.

As shown in FIG. 11, memory device 1103 can include keys 1121. For instance, memory device 1103 can include eight different slots to store keys such as root keys, DICE-RIOT keys, and/or other external session keys.

As shown in FIG. 11, memory device 1103 can include an electronically erasable programmable read-only memory (EEPROM) 1126. EEPROM 1126 can provide a secure non-volatile area available for a host, in which individual bytes of data can be erased and programmed.

As shown in FIG. 11, memory device 1103 can include counters (e.g., monotonic counters) 1125. For instance, memory device 1103 can include six different monotonic counters, two of which may be used by memory device 1103 for authenticated commands, and four of which may be used by the host.

As shown in FIG. 11, memory device 1103 can include an SHA-256 cryptographic hash function 1328, and/or an HMAC-SHA256 cryptographic hash function 1129. SHA-256 and/or HMAC-SHA256 cryptographic hash functions 1128 and 1129 can be used by memory device 1103 to generate cryptographic hashes, such as, for instance, the cryptographic hash of a command as previously described herein, and/or a golden hash used to validate data stored in memory arrays 1101-1 through 1101-7. Further, memory device 1103 can support L0 and L1 of DICE-RIOT 1131.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a," "an," or "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

What is claimed is:

1. An apparatus, comprising:
a processing resource;
memory having instructions executable by the processing resource; and
a sensor coupled to the processing resource and the memory, wherein the sensor is on a roadway or on a sign and the sensor is configured to:
collect sensor data;
generate a sensor public key, a sensor public identification, a sensor identification certificate, and a sensor signature using a sensor private key;
provide the sensor public key, the sensor public identification, the sensor identification certificate, and the sensor data to a sensor fusion unit included in a vehicle; and
transmit the sensor signature to the sensor fusion unit in response to a transmission rate of the sensor data being below a threshold.

2. The apparatus of claim 1, wherein the sensor is configured to encrypt the sensor data using a sensor fusion unit public key prior to providing the sensor data to the sensor fusion unit.

3. The apparatus of claim 1, wherein the sensor data is used to operate the vehicle.

4. The apparatus of claim 1, wherein the sensor is configured to receive a request to provide the sensor data from the sensor fusion unit.

5. The apparatus of claim 4, wherein the sensor is configured to provide the sensor data to the sensor fusion unit in response to receiving the request to provide the sensor data from the sensor fusion unit.

6. The apparatus of claim 1, wherein the sensor is configured to transmit the sensor signature to the sensor fusion unit in response to the sensor transmitting a threshold number of data transmissions.

7. An apparatus, comprising:
a processing resource;
memory having instructions executable by the processing resource; and
a sensor fusion unit included in a vehicle and coupled to the processing resource and the memory, wherein the sensor fusion unit is configured to:
receive a sensor public key, a sensor public identification, a sensor identification certificate, and sensor data from a sensor on a roadway or on a sign;
verify an identity of the sensor based on the sensor public key, the sensor public identification, and the sensor identification certificate;
generate a sensor fusion unit private identification;
encrypt a request using the sensor fusion unit private identification; and
transmit the request to the sensor.

8. The apparatus of claim 7, wherein the sensor fusion unit is configured to:
receive an additional sensor public key, an additional sensor public identification, an additional sensor identification certificate, and additional sensor data from an additional sensor of the vehicle; and
verify an identity of the additional sensor based on the additional sensor public key, the additional sensor public identification, and the additional sensor identification certificate.

9. The apparatus of claim 8, wherein the sensor fusion unit is configured to integrate the sensor data from the sensor with the additional sensor data from the additional sensor in response to verifying the identity of the sensor and the additional sensor.

10. The apparatus of claim 9, wherein the sensor fusion unit is configured to generate vehicle sensor data in response to integrating the sensor data from the sensor with the sensor data from the additional sensor.

11. The apparatus of claim 10, wherein the vehicle sensor data is used in operating the vehicle.

12. The apparatus of claim 7, wherein the sensor fusion unit is configured to:
generate a sensor fusion unit public key;
encrypt a request using the sensor fusion unit public key; and
transmit the request to the sensor.

13. The apparatus of claim 7, wherein the sensor fusion unit is configured to decrypt a sensor signature using the sensor public key.

14. A method of secure sensor communication comprising:
collecting, via a sensor on a roadway or on a sign, sensor data;
generating a sensor signature, a sensor public key, a sensor public identification, and a sensor identification certificate;
providing the sensor signature, the sensor public key, the sensor public identification, the sensor identification certificate, and the sensor data to a sensor fusion unit included in a vehicle;
verifying an identity of the sensor based on the sensor public key, the sensor public identification, and the sensor identification certificate;
generating a sensor fusion unit private identification;
encrypting a request using the sensor fusion unit private identification; and
transmitting the request to the sensor.

15. The method of claim 14, further comprising encrypting the sensor data using a sensor fusion unit public key.

16. The method of claim 15, further comprising generating a sensor fusion unit private key.

17. The method of claim 16, further comprising decrypting the encrypted sensor data using the sensor fusion unit private key.

\* \* \* \* \*